E. M. HAMILTON.
Peat Machine.
No. 71,163.
Patented Nov. 19, 1867.
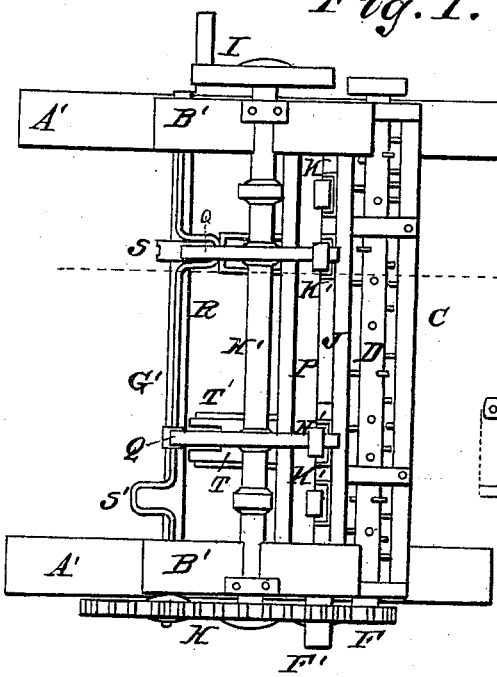
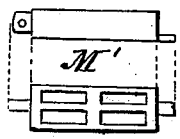
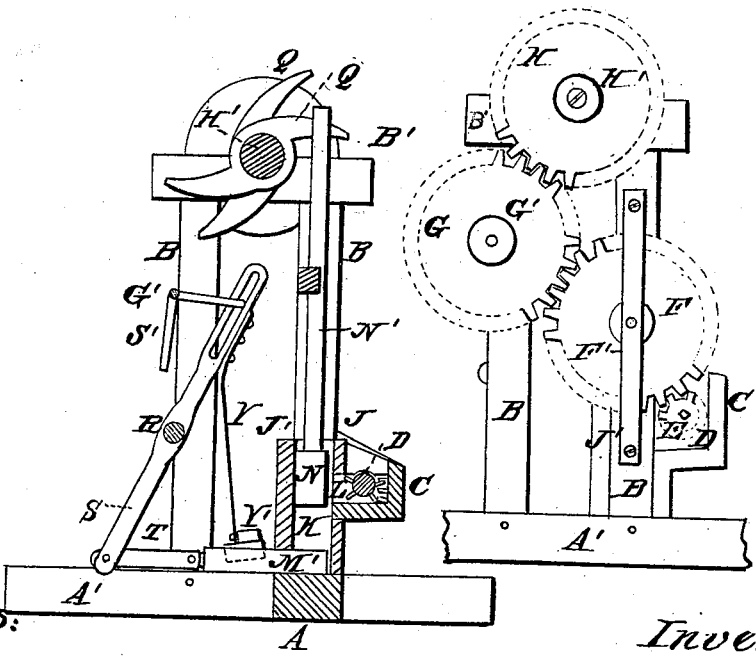
Witnesses:
Chas Hadaway
J. W. Fowler
Inventor:
Ezra M. Hamilton
By his Atty J. Dennis Jr

United States Patent Office.

EZRA M. HAMILTON, OF MINNEAPOLIS, MINNESOTA.

Letters Patent No. 71,163, dated November 19, 1867.

---

IMPROVED MACHINE FOR PRESSING PEAT, CLAY, &c.

---

The Schedule referred to in these Letters Patent and making part of the same.

---

TO ALL WHOM IT MAY CONCERN:

Be it known that I, EZRA M. HAMILTON, of Minneapolis, in Hennepin county, State of Minnesota, have invented certain new and useful Improvements in Machinery for Pressing Peat, Clay, and other Substances; and I do hereby declare the following description and accompanying drawings are sufficient to enable any person skilled in the art or science to which it most nearly appertains to make and use my said invention or improvements without further invention or experiment.

The nature of my invention consists in a novel arrangement of moulds and stampers for forming cakes of peat; and in combining with the moulds and stampers a roller and trough to pulverize the peat and supply it to the moulds; and in a crank working a lever and block to traverse the moulds under the stampers; and in a block arranged on a spring to push the cakes of peat out of the moulds. In the accompanying drawings—

Figure 1 is a plan of a machine for pressing peat and other substances with my improvements.

Figure 2 is a sectional elevation on the line z z, fig. 1.

Figure 3 is an elevation of the left-hand end.

In these drawings A is a sill, framed into the cross-sills A' A', into which sills the posts B B are fastened and connected at the top by the bars B' B', constituting a strong frame, to which the other posts are fastened or connected. The trough C is fastened to the front of the posts B B to receive the peat to be pulverized and pressed. The ends of the trough C are perforated for the journals of the shaft D to turn in, which shaft D is provided with a series of pins, as shown in the drawing, arranged spirally in the shaft to pulverize the peat, in connection with a series of pins in the trough C. The shaft D has the pinion E fastened to it, which is turned by the idle-wheel F, the shaft of which wheel turns in the post B and bracket F', fastened to the post. The wheel or gear F is turned by the gear G on the crank-shaft G', which crank-shaft turns in boxes fastened to the posts B B. The gear G and crank-shaft are turned by the gear H on the main-shaft H', which turns in boxes fastened to the top-bars B' B', and is turned by the pulley I, fastened to it by a belt from some moving power to operate the other parts of the machine. The plank J is fastened to the front of the posts B B and to the trough C. The plank J' is fastened to the rear of the same posts over the sill A, and the space between these planks and the rear side of the trough C is divided into compartments K by a series of partitions, K', and there is an opening, L, in the rear side of the trough C, through which the pulverized peat passes into the compartments K and falls into the moulds M', which are pushed in through openings in the plank J' on to the sill A, and after being filled with peat are pushed out through openings in the plank J under the trough C to the front of the machine. The moulds M' may be made with two or four holes, as shown in Figure 4, and pushed and drawn alternately, so that when the stampers are pressing the peat in one end of the moulds the cakes of peat may be removed from the other end. There are a series of pestles or stampers, N N, arranged to work in the compartments K. The shafts N' of the stampers N are supported by the bar P between the posts B B. The upper ends of the shafts N' are provided with long slots for the tappets Q, fastened on the main shaft H', which tappets lift the stampers and let them fall, to stamp the peat into the moulds at the bottom of the compartments on the sill A. The bar R is fastened to the rear posts B, and forms the fulcrum of the lever S, which has a long slot in its upper end for the crank S', which works it. The lever S carries the pushing-block T, which works on the guide T', fastened to the sill A, to receive the empty moulds M, which are pushed in under the compartments K, and push out the moulds filled by the stampers. When a mould that has been filled is pushed out, the edge of the plank above the mould, or a metal plate fastened on it, strikes or scrapes off the surplus peat above the mould, to make the blocks or cakes of peat of uniform thickness. Two moulds, M', may be fastened together endwise, or made in one piece and hinged to the pushing-block T of the lever S, so as to be pushed and drawn alternately, so that the cakes of peat may be taken out of the moulds M' in front and rear of the sill A, and a spring, V, may be fastened to the lever S, with a block, V', at its lower end, arranged to work down into the moulds M', and push the cakes of peat out of the moulds M' when they are drawn out.

I claim the combination and arrangement of the pulverizing-roller D, stampers N, operated by the tappets Q and shaft H', with the shaft G' and cranks S', working the lever S, with spring V and block V' to push the cakes of peat out of the moulds M', all for joint operation as herein described.

EZRA M. HAMILTON.

Witnesses:
S. M. WILLIAMS,
J. C. WILLIAMS.